United States Patent
Axelsson

(10) Patent No.: US 10,010,050 B2
(45) Date of Patent: Jul. 3, 2018

(54) ENCODER ARRANGEMENT AND ROTARY MILKING PLATFORM ARRANGEMENT

(71) Applicant: DELAVAL HOLDING AB, Tumba (SE)

(72) Inventor: Thomas Axelsson, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 294 days.

(21) Appl. No.: 15/021,941

(22) PCT Filed: Oct. 9, 2014

(86) PCT No.: PCT/SE2014/051195
§ 371 (c)(1),
(2) Date: Mar. 15, 2016

(87) PCT Pub. No.: WO2015/053702
PCT Pub. Date: Apr. 16, 2015

(65) Prior Publication Data
US 2016/0227733 A1    Aug. 11, 2016

(30) Foreign Application Priority Data
Oct. 11, 2013    (SE) ...................................... 1351206

(51) Int. Cl.
*A01J 5/007*    (2006.01)
*A01K 1/12*    (2006.01)

(52) U.S. Cl.
CPC ............... *A01K 1/126* (2013.01); *A01J 5/007* (2013.01)

(58) Field of Classification Search
CPC . A01K 1/126; A01J 5/003; A01J 5/007; A01J 5/0175; A01J 7/04; A01J 5/017; A01J 7/00
(Continued)

(56) References Cited

U.S. PATENT DOCUMENTS 4,183,271 A * 1/1980 Martin ................... B23D 25/12
                                                                    83/156
4,577,411 A    3/1986 Martin
(Continued)

FOREIGN PATENT DOCUMENTS

DE    102 12 676 C1    6/2003
NZ       580616 A      2/2012
(Continued)

OTHER PUBLICATIONS

International-Type Search Report, dated Apr. 2, 2014, from corresponding PCT application.
(Continued)

*Primary Examiner* — Yvonne R Abbott-Lewis
(74) *Attorney, Agent, or Firm* — Young & Thompson

(57) ABSTRACT

An encoder arrangement (2) adapted to be used with a rotary milking platform includes an encoder axle rotatable about an encoder axis (12), an encoder wheel (6) connected to the encoder axle, and a suspension arrangement (8) supporting the encoder and the encoder wheel (6). The encoder and the encoder wheel (6) are arranged on a movable portion (14) of the suspension arrangement (8). The movable portion (14) is biased towards the rotary milking platform. The movable portion (14) is pivotable about a pivot axis (16), and the pivot axis (16) extends perpendicularly to the encoder axis (12).

20 Claims, 4 Drawing Sheets

(58) Field of Classification Search
USPC .................................. 119/14.04, 14.02, 14.08
See application file for complete search history.

(56) References Cited

U.S. PATENT DOCUMENTS

| | | | |
|---|---|---|---|
| 7,310,882 B2 * | 12/2007 | Siraky | G01B 3/12 33/1 PT |
| 7,640,888 B2 | 1/2010 | Holscher et al. | |
| 2005/0166851 A1 | 8/2005 | Holscher et al. | |
| 2010/0307420 A1 | 12/2010 | Axelsson et al. | |
| 2011/0308467 A1 * | 12/2011 | Eckhardt | A01K 1/126 119/14.04 |
| 2012/0210938 A1 * | 8/2012 | Hofman | A01J 7/04 119/14.02 |
| 2012/0222622 A1 * | 9/2012 | Hofman | A01J 7/04 119/14.04 |

FOREIGN PATENT DOCUMENTS

| | | |
|---|---|---|
| RU | 2 471 342 C2 | 1/2013 |
| SU | 572243 A1 | 9/1977 |
| SU | 371720 A3 | 10/1981 |
| WO | 2011/049473 A1 | 4/2011 |

OTHER PUBLICATIONS

International Search Report, dated Mar. 2, 2015, from corresponding PCT application.
Supplementary International Search Report, dated Oct. 16, 2015, from corresponding PCT application.

* cited by examiner

ENCODER ARRANGEMENT AND ROTARY MILKING PLATFORM ARRANGEMENT

TECHNICAL HELD

The present invention relates to an encoder arrangement adapted to be used with a rotary milking platform. The present invention further relates to a rotary milking platform arrangement.

BACKGROUND

Milking systems comprising rotary platforms are known in the art. In such a milking system, animals stand on the rotary platform while they are being milked. A rotary encoder is connected to the rotary platform. The rotary encoder may be used e.g. for controlling a speed of the platform, keeping track of a position of the platform, and/or indexing the platform. The milking system may be fully automatic, i.e. teat cups of the milking system are attached automatically to the teats of the animals, or the teat cups may be attached manually to the teats of the animals.

US 2011/308467 discloses a system and a method for controlling the speed of a rotary milking platform using a rotary encoder. In FIG. 1C the rotary encoder is illustrated. The rotary encoder includes an electromechanical device operable to convert an angular position of a shaft into an electrical signal. The rotary encoder comprises the shaft to which a rotary encoder wheel is coupled. The rotary encoder wheel abuts against the platform and is thus rotated by the platform when the platform rotates.

As illustrated herein in FIG. 1, the rotary encoder of US 2011/308467 is attached to an arm (A) which is pivotable about a vertical axis (B). Thus, the shaft of the rotary encoder and the vertical axis are substantially parallel. The arm and the rotary encoder are pivotably biased towards the rotary platform about the vertical axis. The arm is arranged at an acute angle to the periphery of the rotary platform. The force acting on the rotary encoder wheel and the rotary encoder thus, will differ depending on the direction of rotation of the rotary platform. This may lead to strain on the shaft and/or encoding errors in the rotary encoder. Moreover, encoding errors may be caused by unevenness of the rotary milking platform or an oval shape of the rotary milking platform since a pivoting of the arm about the vertical axis (B), with the rotary encoder wheel in contact with the rotary platform will rotate the shaft of the encoder.

SUMMARY

It is an object of the present invention at least to alleviate the above mentioned problems.

According to an aspect of the invention, the object is achieved by an encoder arrangement adapted to be used with a rotary milking platform, the encoder arrangement comprising:
an encoder comprising an encoder axle rotatable about an encoder axis,
an encoder wheel connected to the encoder axle, the encoder wheel being adapted to abut against a surface of the rotary milking platform, and
a suspension arrangement supporting the encoder and the encoder wheel. The encoder and the encoder wheel are arranged on a movable portion of the suspension arrangement, the movable portion being biased towards the rotary milking platform. The movable portion is pivotable about a pivot axis, wherein the pivot axis extends substantially perpendicularly to the encoder axis.

Since the pivot axis extends substantially perpendicularly to the encoder axis, any unevenness of the rotary milking platform or an oval shape of the rotary milking platform will not lead to any rotation of the encoder axle. Moreover, the pivot axis extending substantially perpendicularly to the encoder axis arrangement entails that conditions are achieved for the encoder wheel to be biased symmetrically on the suspension arrangement towards the rotary platform, with respect to the two rotation directions of the rotary milking platform. Thus, the encoder may be operated without difference in biasing force, independent of the rotational direction of the rotary milking platform. As a result, the above mentioned object is achieved.

The rotary milking platform may comprise a number of milking cubicles arranged on the rotatory milking platform. The animals stand on the rotary platform, one animal per milking cubicle, while they are being milked. One or more milking machines comprising a number of teat cups, flexible milk and vacuum conduits, pulsators, a vacuum source, and milk collection vessels are utilized for milking the animals standing on the rotary milking platform. The teat cups of the milking machine/s may be connected manually to the teats of the animals. Alternatively, the teat cups may be connected automatically to the teats of the animals. Also other milking related actions may be performed automatically, such as cleaning of the teats prior to milking and treating the teats with a disinfectant after milking.

The rotary encoder may be used e.g. for controlling a speed of the platform, keeping track of a position of the platform, and/or indexing the platform. The rotary encoder may comprise an electromechanical device operable to convert an angular position of a shaft into an electrical signal.

According to embodiments, the pivot axis may extend substantially horizontally and the encoder axis may extend substantially vertically, when the encoder arrangement is arranged to engage with a rotary milking platform.

According to embodiments, the encoder arrangement may comprise a pivot axle, the pivot axis extending through and along the pivot axle, wherein the encoder axis may cross the pivot axle seen in a direction perpendicularly to the pivot axle. In this manner the encoder wheel on the suspension arrangement may be biased symmetrically towards the rotary platform, i.e. symmetrically with respect to the two rotation directions of the rotary milking platform. Thus, the encoder arrangement may be operated without difference in biasing force, independent of the rotational direction of the rotary milking platform.

According to embodiments, the suspension arrangement may comprise a fixed portion adapted to be fixedly arranged adjacent to, and separate from, the rotary milking platform, wherein the pivot axis may be arranged between the fixed portion and the movable portion. In this manner the movable portion of the suspension arrangement may be biased from the fixed portion towards the rotary milking platform, pivotably about the pivot axis.

According to embodiments, the encoder arrangement may comprise a biasing member, wherein the biasing member is arranged between the fixed portion and the movable portion to pivot and bias the movable portion about the pivot axis and towards the rotary milking platform.

According to embodiments, the biasing member may comprises a compression spring. In this manner the biasing of the movable portion may be achieved by the compression spring being arranged between the fixed portion and the movable portion pressing the movable portion away from the fixed portion.

According to embodiments, the encoder wheel may be pivotably supported by at least one bearing in the movable portion of the suspension arrangement. In this manner the encoder wheel is supported by a bearing separate from any bearings in the encoder. Thus, the encoder may be relieved from forces acting perpendicularly to the encoder axle on the encoder axle.

According to embodiments, the encoder wheel may be pivotably supported by a first bearing on one side of the encoder wheel and by a second bearing on an opposite side of the encoder wheel. In this manner the encoder wheel is supported by bearings separate from any bearings in the encoder. The encoder may be relieved from forces acting perpendicularly to the encoder axle on the encoder wheel, as well as torque acting on the encoder wheel. The encoder arrangement may thus be insensitive to rotation changes of the rotary milking platform. Thus, a robust suspension of the encoder wheel, separate from the encoder itself, may be achieved.

According to embodiments, the encoder wheel may comprise a circumferential friction surface. In this manner the encoder wheel may reliably engage with the rotary milking platform.

According to embodiments, the encoder wheel may comprise an outer convex surface adapted to abut against the rotary milking platform. Thus, the encoder wheel may have substantially the same rotational diameter abutting against the rotary milking platform, also if the encoder wheel should abut against the rotary milking platform with the encoder axis other than parallel with a relevant surface of the rotary milking platform. It is noted that this is not case in the prior art comprising encoder wheels with flat outer surfaces, such as in US 2011/308467, wherein a slight deviation from a parallel encoder axis with the relevant rotary milking platform surface will lead to diameter differences and encoding errors.

According to a further aspect of the invention, the object is achieved by a rotary milking platform arrangement comprising a rotary milking platform and an encoder arrangement according to any aspect or embodiment disclosed herein.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to Ike elements throughout.

Well-known functions or constructions will not necessarily be described in detail for brevity and/or clarity.

Figure 1:
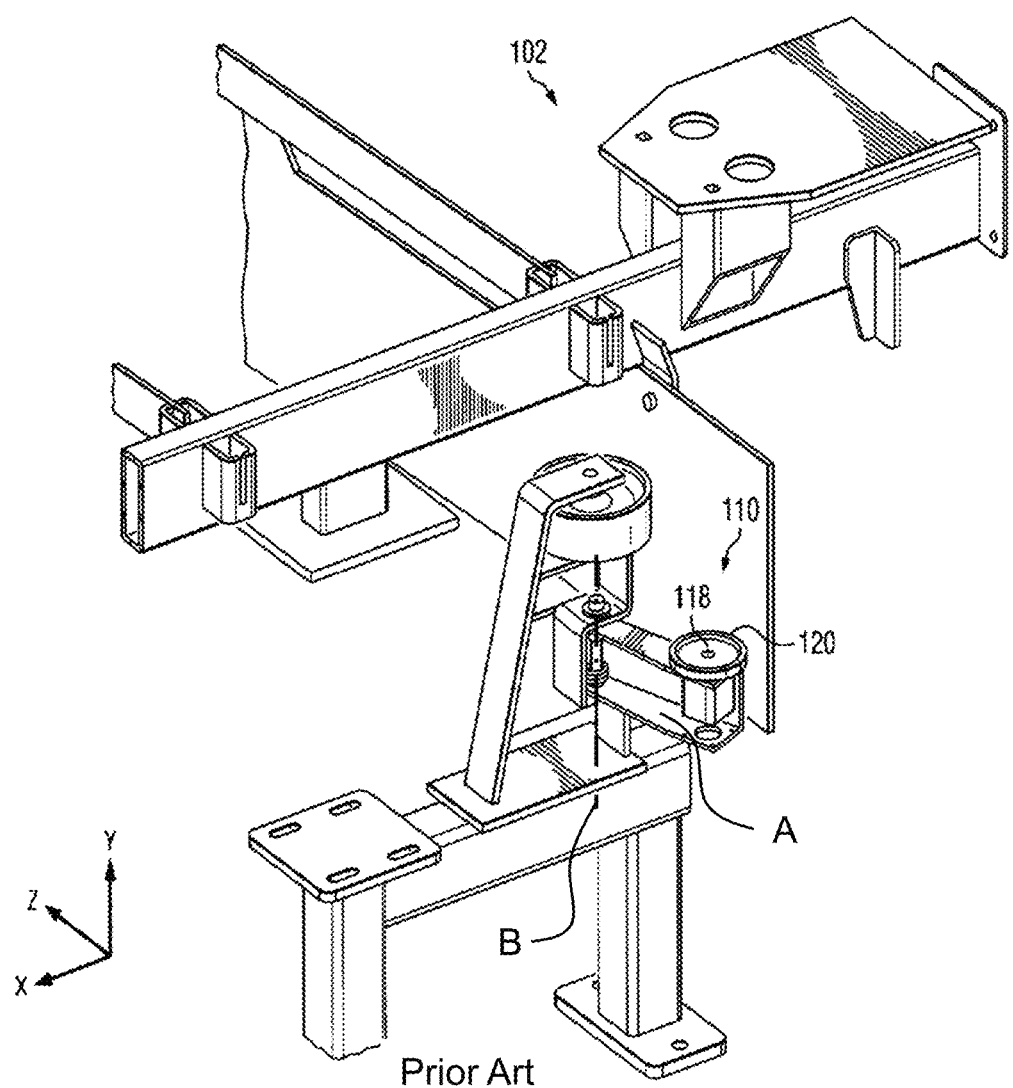
FIG. 1 illustrates a rotary encoder according to the prior art.
Figure 2:
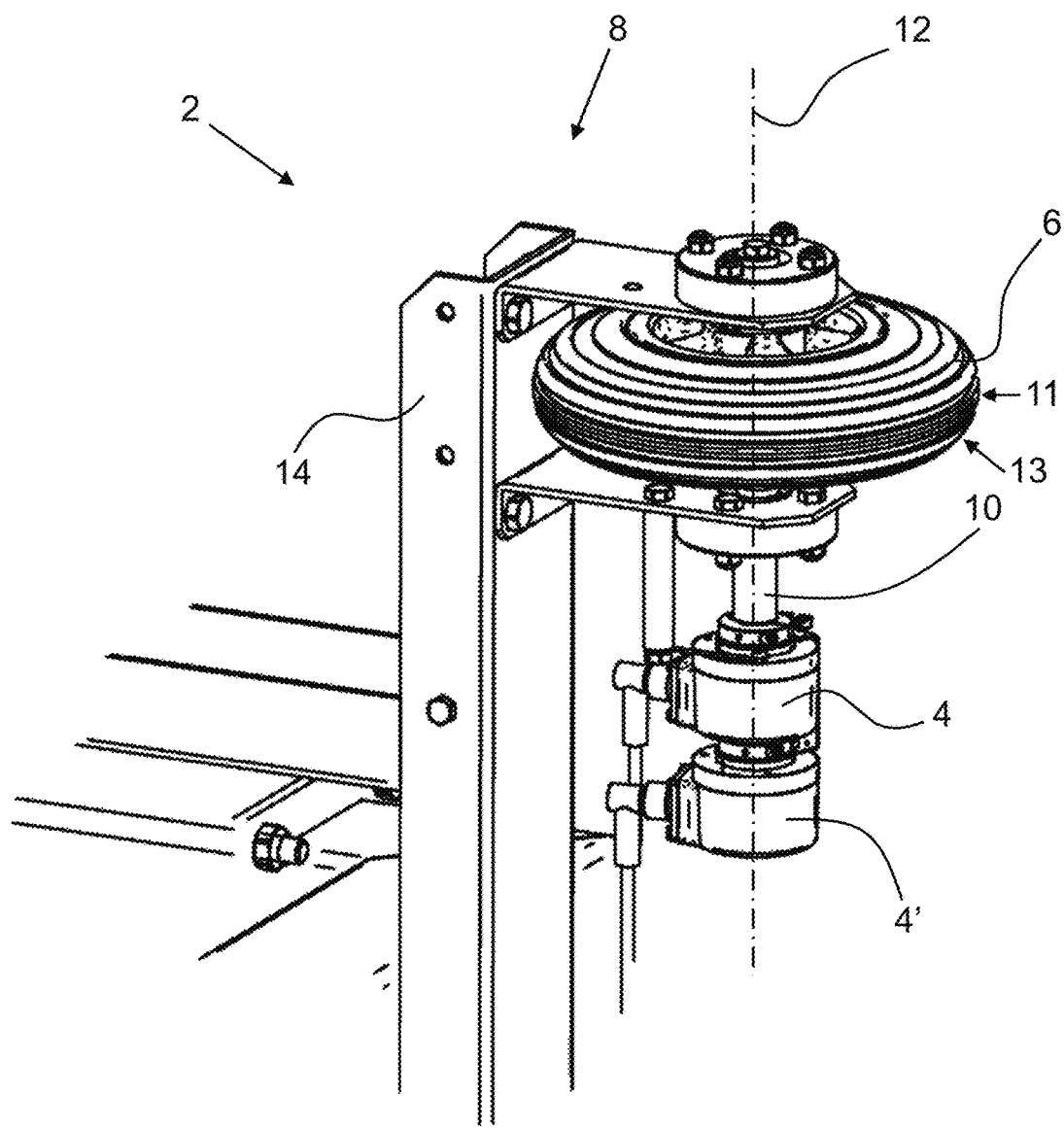
FIG. 2 illustrates a portion of an encoder arrangement according to embodiments.

FIG. 2 illustrates a portion of an encoder arrangement 2 according to embodiments. The encoder arrangement 2 comprises an encoder 4, an encoder wheel 6, and a suspension arrangement 8 supporting the encoder 4 and the encoder wheel 6. The encoder 4 comprises an encoder axle 10 rotatable about an encoder axis 12. The encoder wheel 6 is connected to the encoder axle 10. The encoder wheel 6 is adapted to abut against a surface of a rotary milking platform, see FIG. 5. Thus, the encoder wheel 6 is rotated by the rotary milking platform when the rotary milking platform is rotated. The rotation of the encoder wheel 6 is transferred via the encoder axle 10 to electromechanical parts arranged in the encoder 4.

The encoder 4 and the encoder wheel 6 are arranged on a movable portion 14 of the suspension arrangement 8.

In these embodiments an optional further encoder 4' is illustrated. The further encoder 4' is also arranged on the encoder axle 10. Thus, two encoders 4, 4' rotated by one encoder wheel 6 are provided. Each encoder 4, 4' may be provided for a different control system of the rotary milking platform, and/or a milking system, and/or animal treatment system such as systems for teat cleaning or teat disinfecting. Alternatively, the further encoder 4' may be provided redundantly, as a spare encoder in case the encoder 4 should malfunction.

The encoder wheel 6 may comprise a circumferential friction surface 11, e.g. made from rubber or TPE (Thermo Plastic Elastomer). 10. The encoder wheel 6 comprises an outer convex surface 13 adapted to abut against the rotary milking platform. The outer convex surface 13 is convex seen in a cross section through the encoder wheel 6 in a plane along the encoder axis 12.

Figure 3:
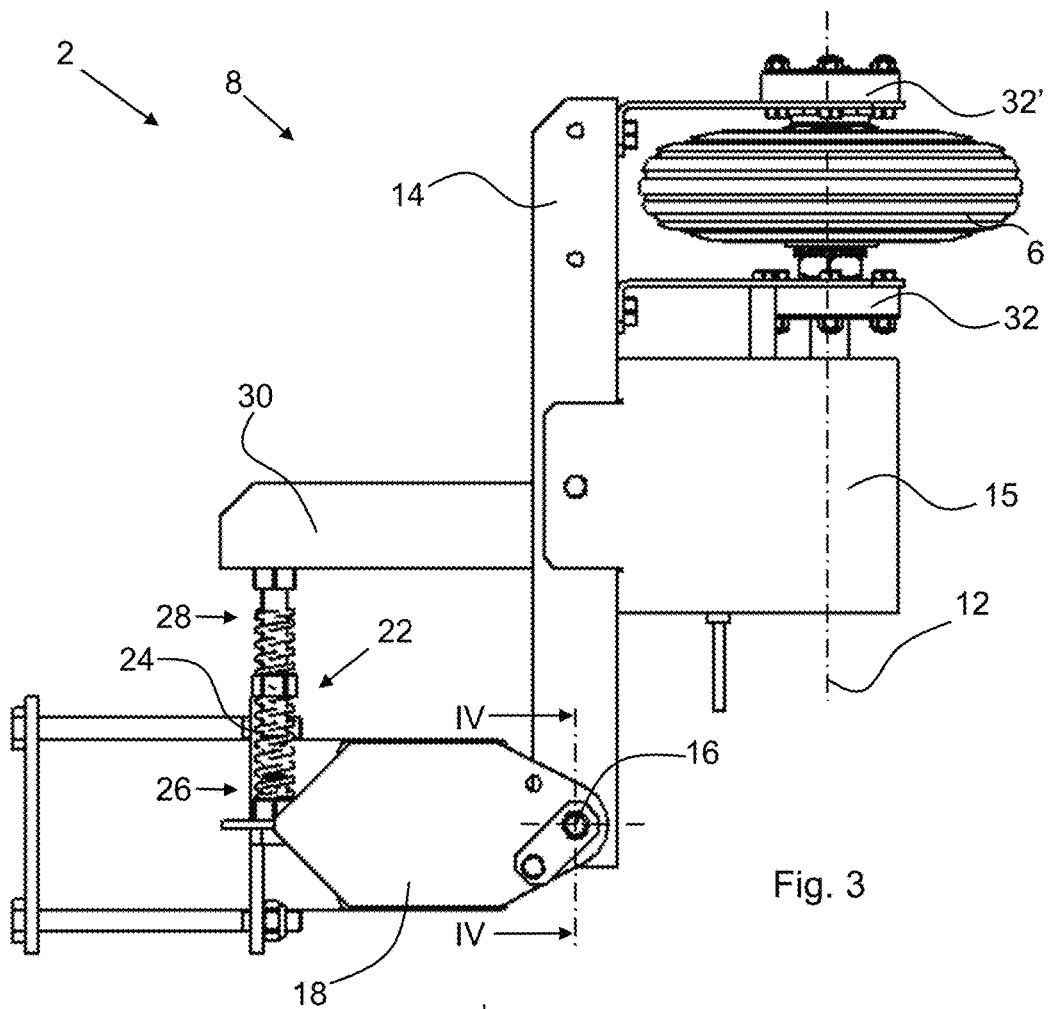
FIG. 3 illustrates an encoder arrangement according to embodiments.
Figure 4:
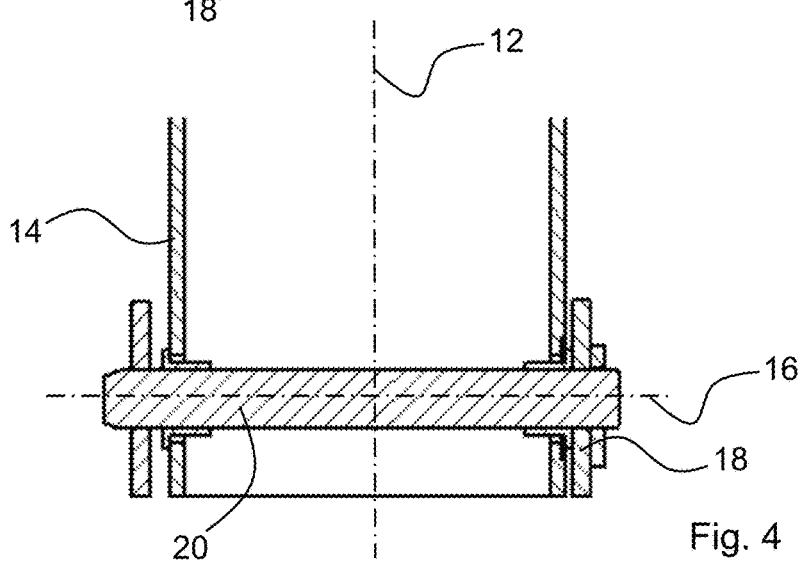
FIG. 4 illustrates a cross section through a portion of the encoder arrangement illustrated in FIG. 3.

FIG. 3 illustrates an encoder arrangement 2 according to embodiments, adapted to be used with a rotary milking platform. The encoder arrangement 2 comprises the portion illustrated in FIG. 2. The encoders are covered by a protective shield 15. FIG. 4 illustrates a cross section along the line IV-IV in FIG. 3. In the following reference will be made both to FIG. 3 and FIG. 4.

The movable portion 14 of the suspension arrangement 8 is pivotable about a pivot axis 16. The suspension arrangement 8 comprise a fixed portion 18 adapted to be fixedly arranged adjacent to, and separate from, the rotary milking platform. The suspension arrangement 8 comprise a pivot axle 20. The pivot axis 16 extends through and along the pivot axle 20. The pivot axis 16 and the pivot axle 20 are arranged between the fixed portion 18 and the movable portion 14. The pivot axle 20 connects the movable portion 14 to the fixed portion 18.

The pivot axis 16 extends substantially perpendicularly to the encoder axis 12. More specifically, the encoder axis 12 crosses the pivot axle 20 seen in a direction perpendicularly to the pivot axle 20, i.e. as illustrated in FIG. 4. This encompasses the encoder axis 12 and the pivot axis 16 extending in one and the same plane, as well as the encoder axis 12 and the pivot axis 16 extending in different planes, as in the embodiments illustrated in FIGS. 3 and 4.

The movable portion 14 is adapted to be biased towards the rotary milking platform. For this purpose the encoder arrangement 2 comprises a biasing member 22. The biasing member 22 is arranged between the fixed portion 18 and the movable portion 14, and biases the movable portion 14 to pivot about the pivot axis 16 towards the rotary milking platform. The biasing member 22 comprises a compression spring 24, such as a helical spring. A first end 26 of the compression spring 24 is connected to the fixed portion 18. A second end 28 of the compression spring 24 is connected to an arm member 30 of the movable portion 14.

Since the encoder axis 12 crosses the pivot axle 20, as discussed above, the encoder wheel 6 is mounted on the suspension arrangement to be biased symmetrically towards the rotary platform, i.e. symmetrically with respect to the two rotation directions of the rotary milking platform. Thus, irrespective of the rotation direction of the rotary platform, the encoder may be operated without difference in biasing force, independent of the rotational direction of the rotary milking platform.

The encoder wheel 6 is pivotably supported by at least one bearing 32 in the movable portion 14 of the suspension arrangement 8. The at least one bearing 32 is separate from the encoder of the encoder arrangement 2. In these embodiments, the encoder wheel 6 is pivotably supported by a first bearing 32 on one side of the encoder wheel 6 and by a second bearing 32' on an opposite side of the encoder wheel 6. Naturally, the first and second bearings 32, 32' support the encoder wheel 6 pivotably about the encoder axis 12.

Figure 5:
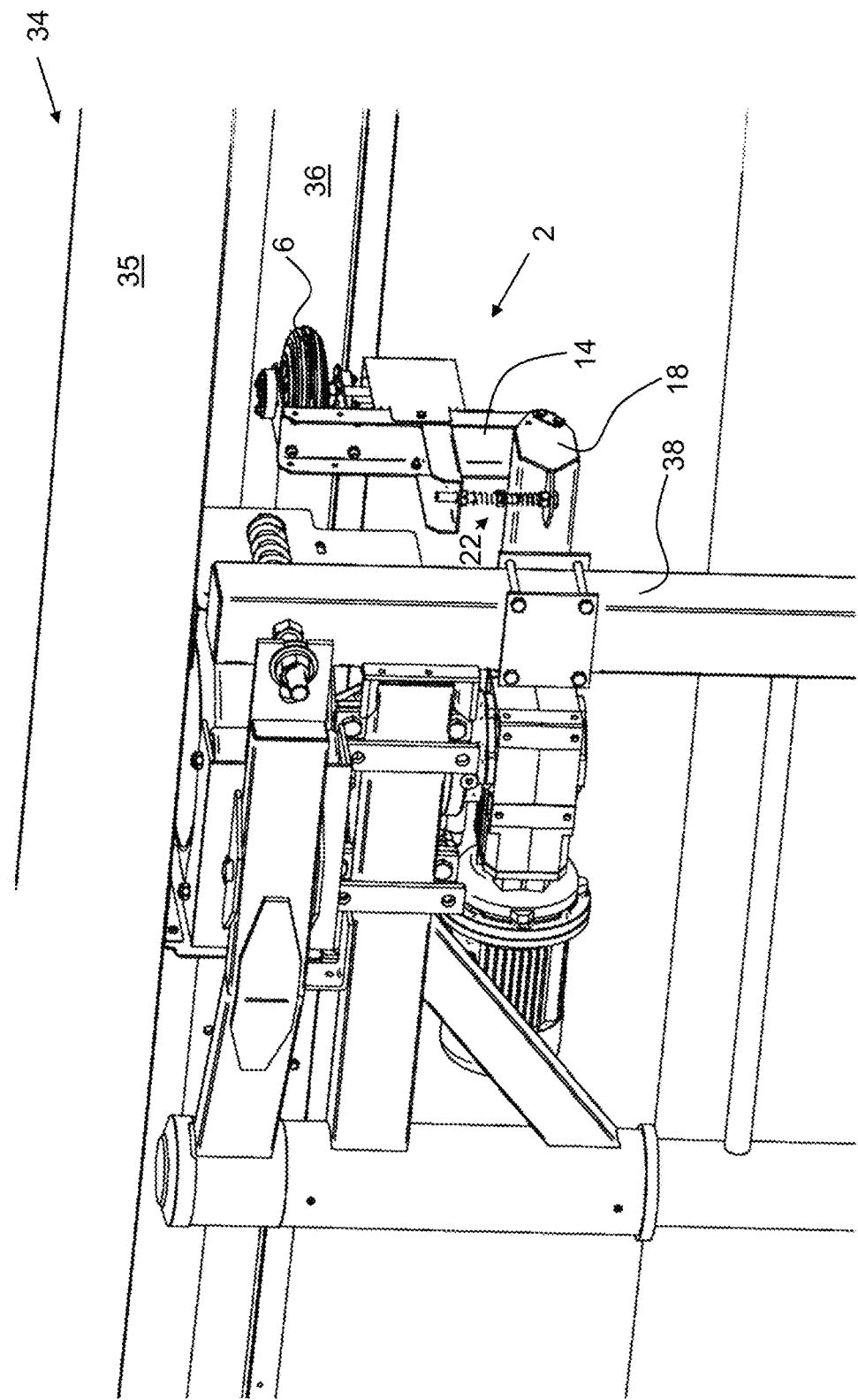
FIG. 5 illustrates a rotary milking platform arrangement according to embodiments.

As illustrated in FIG. 3, the encoder arrangement 2 is positioned to engage with a rotary milking platform, see also FIG. 5. In this position the pivot axis 16 extends substantially horizontally and the encoder axis 12 extends substantially vertically. Thus, the encoder wheel 6 is arranged to abut against a substantially vertical surface of the rotary milking platform. Alternatively, the encoder axis 12 could instead extend substantially horizontally. Arranged in such a position the encoder 6 would be arranged to abut against a substantially horizontal surface of the rotary milking platform.

FIG. 5 illustrates a portion of a rotary milking platform arrangement 34 according to embodiments. The rotary milking platform arrangement 34 comprises a rotary milking platform 35 and an encoder arrangement 2 according to any aspect or embodiment disclosed herein. The encoder wheel 6 of the encoder arrangement 2 abuts against a surface 36 of the rotary milking platform 35. The surface 36 extends circumferentially and continuously around the rotary milking platform 35. The fixed portion 18 of the encoder arrangement 2 is connected to a post 38 of the rotary milking platform arrangement 34. The post 38 is arranged stationary beside the rotary milking platform 35. Thus, supported by the fixed portion 18, the movable portion 14 is biased towards the rotary milking platform 35 by the biasing member 22.

Mentioned purely as an example, the rotary milking platform 35 may have a diameter of 10-30 meters, the movable portion 14 may have a length of approximately 30 cm from the pivot axis 16 to the encoder wheel 6, the fixed portion 18 may have a length of approximately 15 cm from the pivot axis 16 to the biasing member 22, and the encoder wheel 6 may have a diameter of approximately 18 cm.

This invention should not be construed as limited to the embodiments set forth herein. A person skilled in the art will realize that different features of the embodiments disclosed herein may be combined to create embodiments other than those described herein, without departing from the scope of the present invention, as defined by the appended claims. It is also understood by those skilled in the art that the encoder wheel 6 may abut against an inner circumferential surface of the rotary milking platform instead of the illustrated outer circumferential surface 36. Similarly, the encoder wheel 6 may abut against a horizontal surface of the rotary milking platform, such as an underside of the rotary milking platform. The encoder 4 may be arranged above the encoder wheel 6, instead of below as illustrated in FIG. 2. The fixed portion 18 may be directly connected to the floor adjacent to the rotary milking platform.

Although the invention has been described with reference to example embodiments, many different alterations, modifications and the like will become apparent for those skilled in the art. Therefore, it is to be understood that the foregoing is illustrative of various example embodiments and that the invention is defined only the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. An encoder arrangement (2) adapted to be used with a rotary milking platform, the encoder arrangement (2) comprising:
    an encoder (4) comprising an encoder axle (10) rotatable about an encoder axis (12);
    an encoder wheel (6) connected to the encoder axle (10), the encoder wheel (6) being adapted to abut against a surface of the rotary milking platform; and
    a suspension arrangement (8) supporting the encoder and the encoder wheel (6),
    wherein the encoder (4) and the encoder wheel (6) are arranged on a movable portion (14) of the suspension arrangement (8), the movable portion (14) being biased towards the rotary milking platform, and
    wherein the movable portion (14) is pivotable about a pivot axis (16), the pivot axis (16) extending perpendicularly to the encoder axis (12).

2. The encoder arrangement (2) according to claim 1, wherein, when the encoder arrangement (2) is arranged to engage with the rotary milking platform, the pivot axis (16) extends horizontally and the encoder axis (12) extends vertically.

3. The encoder arrangement (2) according to claim 1, further comprising a pivot axle (20), the pivot axis (16) extending through and along the pivot axle (20), wherein the encoder axis (12) crosses the pivot axle (20) when viewed in a direction perpendicularly to the pivot axle (20).

4. The encoder arrangement (2) according to claim 1, wherein the suspension arrangement (8) comprises a fixed portion (18), adapted to be fixedly arranged adjacent to, and separate from, the rotary milking platform, and wherein the pivot axis (16) is arranged between the fixed portion (18) and the movable portion (14).

5. The encoder arrangement (2) according to claim 4, further comprising a biasing member (22), wherein the biasing member (22) is arranged between the fixed portion (18) and the movable portion (14) to pivot and bias the movable portion (14) about the pivot axis (16) and towards the rotary milking platform.

6. The encoder arrangement (2) according to claim 5, wherein the biasing member (22) comprises a compression spring (24).

7. The encoder arrangement (2) according to claim 1, wherein the encoder wheel (6) is pivotably supported by at least one bearing (32) in the movable portion (14) of the suspension arrangement (8).

8. The encoder arrangement (2) according to claim 1, wherein the encoder wheel (6) is pivotably supported by a first bearing (32) on one side of the encoder wheel (6) and by a second bearing (32') on an opposite side of the encoder wheel (6).

9. The encoder arrangement (2) according to claim 1, wherein the encoder wheel (6) comprises a circumferential friction surface (11).

10. The encoder arrangement (2) according to claim 1, wherein the encoder wheel (6) comprises an outer convex surface (13) adapted to abut against the rotary milking platform.

11. The encoder arrangement (2) according to claim 1 in combination with the rotary milking platform (35),
wherein the encoder wheel (6) comprises a circumferential surface (11),
wherein, with the encoder arrangement (2) engaged with the rotary milking platform, the encoder wheel (6) engages against the surface of the rotary milking platform.

12. The encoder arrangement (2) and rotary milking platform combination according to claim 11, wherein, with a circumferential surface (11) of the encoder wheel (6) engaged against the surface of the rotary milking platform, the pivot axis (16) extends horizontally and the encoder axis (12) extends vertically.

13. The encoder arrangement (2) and rotary milking platform combination according to claim 12, further comprising a pivot axle (20), the pivot axis (16) extending through and along the pivot axle (20), and
wherein, when viewed in a direction perpendicularly to the pivot axle (20), the encoder axis (12) crosses the pivot axle (20).

14. The encoder arrangement (2) and rotary milking platform combination according to claim 13,
wherein the suspension arrangement (8) comprises a fixed portion (18), fixedly arranged adjacent to, and separate from, the rotary milking platform, and
wherein the pivot axis (16) is arranged between the fixed portion (18) and the movable portion (14).

15. The encoder arrangement (2) and rotary milking platform combination according to claim 14, further comprising a biasing member (22), wherein the biasing member (22) is arranged between the fixed portion (18) and the movable portion (14) to pivot and bias the movable portion (14) about the pivot axis (16) and towards the rotary milking platform.

16. The encoder arrangement (2) and rotary milking platform combination according to claim 15, wherein the biasing member (22) comprises a compression spring (24).

17. The encoder arrangement (2) and rotary milking platform combination according to claim 16, wherein,
the encoder wheel (6) is pivotably supported by at least one bearing (32) in the movable portion (14) of the suspension arrangement (8),
the encoder wheel (6) is pivotably supported by a first bearing (32) on one side of the encoder wheel (6) and by a second bearing (32') on an opposite side of the encoder wheel (6), and
the encoder wheel (6) comprises an outer convex surface (13) that abuts against the rotary milking platform.

18. The encoder arrangement (2) and rotary milking platform combination according to claim 11, wherein the encoder wheel (6) is pivotably supported by at least one bearing (32) in the movable portion (14) of the suspension arrangement (8).

19. The encoder arrangement (2) and rotary milking platform combination according to claim 11, wherein the encoder wheel (6) is pivotably supported by a first bearing (32) on one side of the encoder wheel (6) and by a second bearing (32') on an opposite side of the encoder wheel (6).

20. The encoder arrangement (2) and rotary milking platform combination according to claim 11, wherein the encoder wheel (6) comprises an outer convex surface (13) that abuts against the rotary milking platform.

* * * * *